Patented July 20, 1954

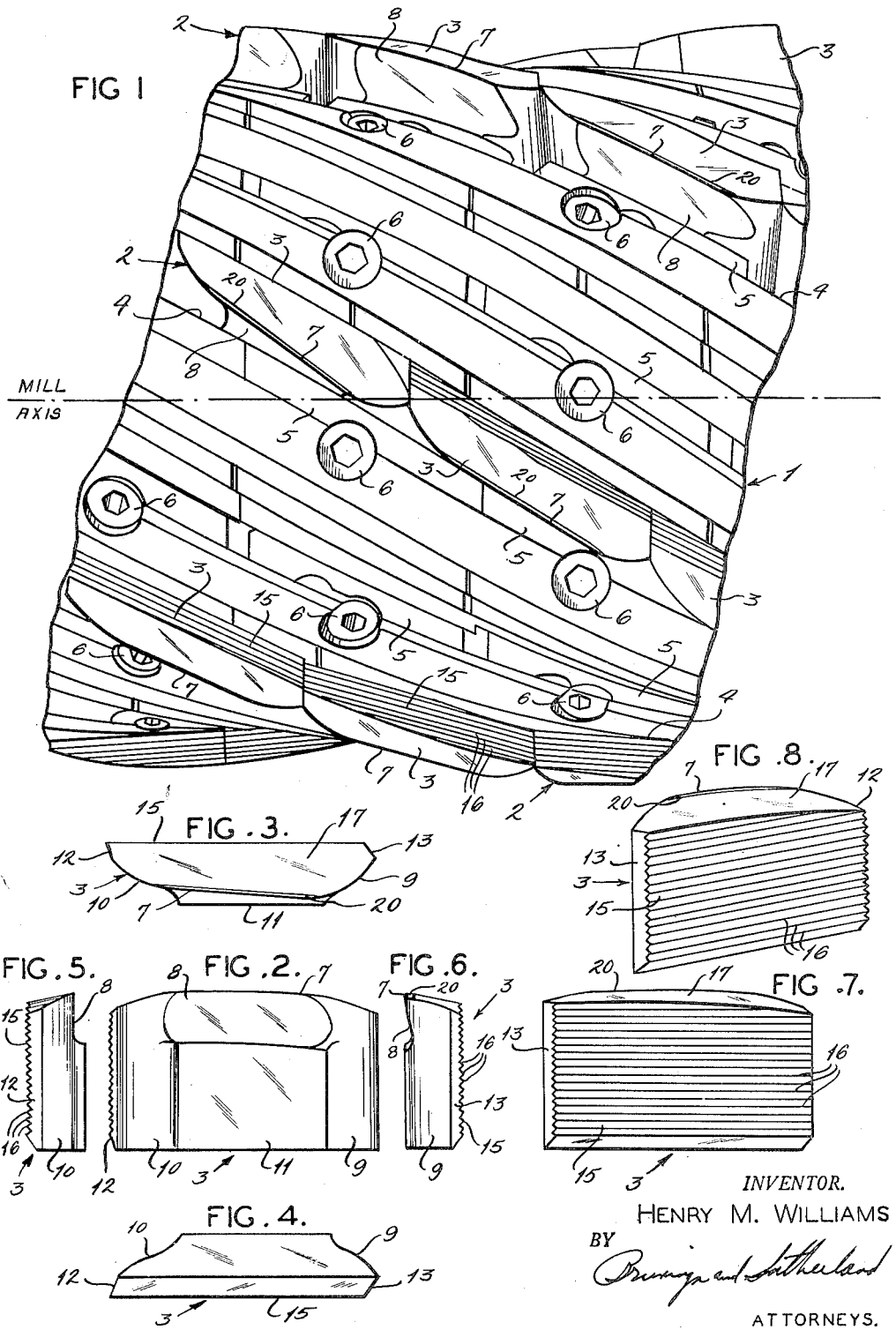

2,683,920

UNITED STATES PATENT OFFICE 2,683,920

MILLING CUTTER

Henry M. Williams, Alton, Ill., assignor to Olin Industries, Inc., East Alton, Ill., a corporation of Delaware Application November 24, 1950, Serial No. 197,261

8 Claims. (Cl. 29—105)

The invention relates to milling cutters and in particular to profile cutters.

In milling broad surfaces, it is often desirable to provide milling cutter blades which remove a series of relatively small chips. For this purpose, it has been common practice in integral-blade mills to nick the cutting edges of the blades. The most common method of nicking the blades has been to form grooves at regular intervals intersecting the blades at right angles to the mill axis, such a nick reducing the radius of the blade at the locus thereof. One difficulty with such grooves in profile cutters is that if the grooves are made V-shaped, the nick becomes smaller as the blades are ground, and if the grooves are made deep enough to withstand repeated grindings, the relatively unsupported edges of the groove are liable to breakage. A further difficulty arises from the fact that, although the grooves in neighboring blades are offset longitudinally of the mill axis so that in operation the nick of one blade is followed by the cutting edge of the succeeding blade, the cutting edge of the succeeding blade does not completely lap the area left uncut by the nick. The peak thus left by the notched blade has been found in practice to be of substantial height. When the surface of the metal is subsequently rolled, the peak folds over so that when the strip is annealed, oxide film is formed in the crevice to produce a flaw in the strip.

Another method of nicking has been proposed wherein holes extending more or less radially through the blade nick the cutting edge. The contour of such a nick remains constant with grinding. However, such a blade is difficult and expensive to produce, the cutting edges are unsupported at their ends, and the pattern produced by such a blade on the surface of the milled metal is similar to that produced by the groovedly nicked blade.

In the insertable-tooth type of blade, the teeth have heretofore been set so as to correspond as nearly as possible to the continuous cutting edge of the integral blade type and any notches which have been formed have followed the teachings of the integral blade type art, produced the same effect, and had the same disadvantages as the notches in that type of blade.

One of the objects of this invention is to provide a profile milling cutter having blades which produce small chips, are able to withstand the strains to which milling cutters are subjected, retain their configuration after repeated grindings, and are simple and cheap to manufacture.

Another object is to provide such a milling cutter, having insertable teeth.

Further objects will be apparent to those skilled in the art in the light of the specification and accompanying drawings.

In accordance with this invention, generally stated, a milling cutter is provided, each of the blades of which is made up of a plurality of teeth. The teeth may be integral with the blade or the blade may be made up of separately insertable teeth. The integral tooth type blade may, in turn, be insertable within the milling cutter body, or integral therewith. When the blade is made up of a plurality of insertable teeth, the outer edges of the teeth may be so chamfered as to permit contiguous teeth to scarf tightly against one another.

Each of the teeth, whether separately insertable or integral with its blade, is provided with a cutting edge along the upper edge of a central section of the leading face of the tooth. This central section is defined at either side by sections flared back convexly from the leading face of the tooth, to leave a supporting lip extending beyond and behind the cutting edge on either side thereof. The flared back sections are formed to meet the leading face and, therefore, the cutting edge, substantially tangentially.

The flared back sections may extend through the width (i. e. the radial dimension) of the tooth face (that portion of the tooth projecting above the milling cutter body) or, in the insertable tooth or in the integral tooth type insertable blade, may extend through the full width of the tooth. Thus the tooth thickness through the width of the tooth face in any of the blade types varies lengthwise of the tooth, increasing from one end to the cutting edge and decreasing from the cutting edge to the other end. The tooth thickness through the length of the cutting edge will be determined by the type of milling cutter involved. "Spiral," helical and radial mills, in which the teeth are formed with varying helical or radial rakes, will produce differences in thickness and configuration of the teeth through the length of the cutting edge, particularly in insertable-type teeth.

In the drawings:

Figure 1 is a fragmentary view in side elevation of a helical milling cutter with teeth constructed in accordance with one embodiment of this invention set therein;

Figure 2 is a view in front elevation of a milling cutter tooth made in accordance with this invention;

Figure 3 is a plan view of the tooth shown in Figure 2;

Figure 4 is a bottom plan view of the tooth of Figure 2;

Figure 5 is an end view of the tooth shown in Figure 2;

Figure 6 is an end view of the opposite end from Figure 5 of the tooth shown in Figure 2;

Figure 7 is a view in rear elevation of the tooth shown in Figure 2; and

Figure 8 is a rear view in perspective of the tooth shown in Figure 7.

Referring now to the illustrative embodiment of this invention shown in the drawings, 1 represents a helical milling cutter, the blades 2 of which are made up of a series of teeth 3. In the art, a mill in which the helix angle is as flat as that of the embodiment shown is known as a spiral mill. However, the term helical milling cutter is here used in its broad sense. The teeth 3 are mounted within channels 4 in the mill body by means of mounting blocks 5 and tapered set screws 6. The teeth 3 are provided with cutting edges 7. In describing the teeth, that portion 8 which is shown in Figure 1 as extending above the channels 4 of the cutter body on the leading side will be referred to as the tooth faces. The teeth 3 are shown in detail in Figures 2 through 8. Referring particularly to those figures, the cutting edge 7 of each of the teeth 3 extends along the center section of the tooth. At each end of the cutting edge 7, the tooth face 8 is flared back convexly through the entire width of the tooth to form right curved bevel 9 and left curved bevel 10. A front panel 11 is defined by the tooth face 8 at the panel's upper edge, and right curved bevel 9 and left curved bevel 10 at its either side. Left curved bevel 10 terminates in a plane bevel 12. Right curved bevel 9 is chamfered at its edge at 13 parallel to plane bevel 12 to fit the plane bevel 12 of a contiguous tooth when a blade is assembled. Front panel 11 is flat and parallel with the back 15 of the tooth. The back 15 is provided with serrations 16 corresponding with serrations in one side of channel 4 so that when the tooth 3 is clamped within the channel 4 by a mounting block 5 bearing against the front panel 11, the tooth is secured against radial displacement. In the embodiment shown, the tooth face 8 is cut to a helical rake so that the tooth face is not parallel with the front panel 11. A lip 17 extends from the back 15 to the cutting edge 7. A land 20 is formed on the lip 17 along the cutting edge 7.

The width of the land 20, the relief angle of the land, and the lip angle of the tooth will be determined by the type of work to which the tooth is to be applied, the type of mill in which the tooth is to be inserted, and whether the work is to be milled up or down.

In operation, the teeth are inserted within the channels 4 so that they are scarfed tightly against one another. The mounting blocks 5 are tightened against the front panels 11 of the teeth by tapered set screws 6. The fact that the front panel 11 and back 15 of each tooth are parallel and flat facilitates mounting.

The teeth forming one blade are inserted so as to be offset longitudinally of the cutter axis from those of the adjacent blades, so that on a piece of stock fed in such a manner that the direction of feed is perpendicular to the axis of the mill (though the work passes below and parallel to the mill axis), the space uncut by the flared-back portion of one tooth is lapped by the cutting edge of a tooth in the following blade.

No matter how much the lip of a tooth is ground, the flared-back bevels will remain the same, and will remain behind the cutting edge. The cutting edge is solidly backed through its entire length and beyond.

It can be seen that the flared-back bevels need be formed through only the width of the tooth face to accomplish the desired results. However, particularly in a helical mill where the channels in the mill body are necessarily curved somewhat, a front panel extending only under the tooth face is advantageous. Bevels extending through the width of the tooth are also simpler to form. The chamfered edges of the full-width bevels also make a simple tight joint.

The construction of integral tooth type blades is substantially the same as that of the assembled blades of the illustrative embodiment. The principal difference, of course, is in their manufacture, which may be carried out in any well-known manner.

As has been pointed out, the flared-back bevels meet the tooth face substantially tangentially. These bevels may approach plane bevels, but, at the tooth face, must not become concave. This construction not only provides a completely supported cutting edge, but produces a surface pattern which is not subject to the objectionable peaking and grooving of the nicked blades of the prior art. As was briefly discussed above, the presence of sharp peaks in the surface leads to imperfect strip in which oxide is incorporated. A groove produced by the sharp edge of a nicked cutter is elongated as the strip is rolled, fills with dirt, and results in poor quality finished strip.

On the other hand, neither a sharp peak nor a groove is formed when stock is moved through a milling cutter having blades constructed in accordance with this invention so rapidly that the flared-back section of one blade is not completely lapped by the cutting edge of the following blade. The unremoved metal forms a roughly triangular pattern but no peak of any substantial height. These triangular patterns roll out smoothly. It is self-evident, from the description of the construction of the teeth, that no sharp edge can be present to produce a groove.

Another advantage of the cutter blade of this invention over the blades of the prior art is that with it an essentially smooth surface is obtained even if the blade is not absolutely concentric with the mill axis.

It has been found that the use of the blade of this invention permits feeding of stock at a materially faster rate than was possible with blades known heretofore. In milling brass strip, for example, increases of approximately fifty per cent have been found possible, still to produce acceptable strip.

It can be seen that the teeth of this invention can advantageously be used in a great variety of mills in which a plurality of teeth are used to form a single blade.

Numerous variations in construction within the scope of the appended claims will be apparent to those skilled in the art in the light of this specification.

Having thus described the invention, what is claimed and desired to be secured by Letters Patent is:

1. A profile milling cutter blade comprising a plurality of teeth, the tooth face of each tooth being flared back convexly at both ends through substantially the width of the tooth face to define an intermediate cutting edge.

2. A profile milling cutter having a plurality of blades, each of said blades comprising a plurality of teeth, the tooth face of each tooth being flared back convexly at both ends through the width of the tooth face to define an intermediate cutting edge, the teeth of each blade being offset axially of the milling cutter from the teeth in the following blade so that in a vertical plane perpendicular to the axis of the milling cutter a flared-back portion of the tooth in one blade is followed by the cutting edge of a tooth in the following blade.

3. An insertable profile milling cutter tooth, the tooth face of which is flared back convexly at both ends through the width of the tooth face to define an intermediate cutting edge.

4. An insertable tooth for use in a helical milling cutter, comprising a front panel, a back parallel with said front panel, a tooth face above said front panel, said tooth face being flared back convexly at both ends through the width of the tooth face to define an intermediate cutting edge, and a lip extending from said cutting edge to said back along the length of the tooth face.

5. A profile milling cutter blade comprising a plurality of teeth, each tooth being flared back convexly at both ends through the width of the tooth to define an intermediate cutting edge.

6. A profile milling cutter blade comprising a plurality of teeth, each of said teeth having a central tooth face section the upper edge of which defines the cutting edge of the tooth and convexly flared-back sections defining the central tooth face section and meeting the central tooth face section substantially tangentially.

7. An insertable profile milling cutter tooth, the tooth face of which is flared back convexly at both ends on a substantially cylindrical section tangent to the resulting center panel of the tooth face to produce a tooth of uniform cross-section through the radial width of the tooth face.

8. A milling cutter blade comprising a plurality of insertable teeth, the tooth face of each tooth being flared back convexly at both ends through the width of the tooth face to define an intermediate cutting edge, said teeth being scarfed to form a continuous blade with a discontinuous cutting edge.

References Cited in the file of this patent

UNITED STATES PATENTS

| Number | Name | Date |
| --- | --- | --- |
| 960,526 | Erlandsen | June 7, 1910 |
| 1,194,865 | Muller | Aug. 15, 1916 |
| 1,514,709 | Lyon | Nov. 11, 1924 |
| 1,551,015 | Duchesne | Aug. 25, 1925 |
| 2,207,909 | Besaw | July 16, 1940 |
| 2,257,169 | Hopps | Sept. 30, 1941 |